UNITED STATES PATENT OFFICE 2,289,050

SOLUTION OF DIFFICULTLY WATER SOLUBLE MEDICINAL AGENTS

Otto Schnider, Basel, Switzerland, assignor to Hoffman-La Roche Inc., Nutley, N. J., a corporation of New Jersey No Drawing. Application March 22, 1939, Serial No. 263,547. In Germany May 29, 1937

8 Claims. (Cl. 167—52)

This invention relates to a preparation of solutions of medicinal agents difficultly soluble in water, and is in part a continuation of my earlier application S. N. 199,989, filed April 4, 1938.

I have found that substances difficultly soluble in water, such as certain medicinal agents, can be dissolved by treating these products with lower saturated alkyl esters of $\beta$-acetamino butyric acid of the following formula:

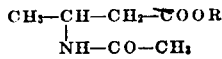

wherein R represents an alkyl radical containing not more than three carbon atoms, either alone or in combination with water. These compounds may be advantageously employed, for example, for preparing homogeneous solutions of allyl isopropyl barbituric acid, diethyl barbituric acid, quinine hydro chloride, camphor, acetyl salicylic acid, and 2,4-dioxo-3,3-diethyl tetrahydro pyridine.

The lower saturated alkyl esters of $\beta$-acetamino butyric acid of the type specified have been found to be miscible with water in all proportions, as well as being excellent solvents for difficultly soluble medicinal agents. The compounds are only hydrolyzed with difficulty in neutral aqueous solutions. Since their toxicity has been found to be very low, they may be employed even without water in the preparation of medicinal solutions for oral, as well as parenteral, administration. They can be injected in any concentration without producing irritation.

The $\beta$-acetamino butyric acid esters are obtained by catalytic hydrogenation of the corresponding 2-acetamino crotonic esters with the aid of ordinary catalysts such as palladium or nickel. The reduction may be effected at atmospheric or raised pressures, depending upon the catalyst chosen. The hydrogenation may be carried out in the presence or absence of solvents.

The following examples further illustrate the invention, but the scope of the invention is not restricted thereto. The parts are parts by weight, unless otherwise stated.

Example 1

10 parts of allyl isopropyl barbituric acid are treated with a mixture of 60 parts of $\beta$-acetamino butyric acid ethyl ester and 40 parts of water. The resulting solution is clear, colourless and may be further diluted with water, if so desired.

The same result may be obtained by using $\beta$-acetamino butyric acid methyl ester instead of $\beta$-acetamino butyric acid ethyl ester.

Example 2

25 parts of quinine hydrochloride are dissolved in a mixture of equal parts of $\beta$-acetamino butyric acid ethyl ester and water, the total quantity of the solution being brought to 100 parts by volume.

With the same quantity of solubilising agents 8 parts of quinine base may be dissolved to a stable solution, which, in case of need, may be further diluted with water.

Example 3

20 parts of camphor easily dissolve in 83 parts of $\beta$-acetamino butyric acid ethyl ester, the total quantity of the solution being 100 parts by volume.

Example 4

In the same way as given in Example 3, 25 parts of acetyl salicylic acid may be dissolved in 79 parts of $\beta$-acetamino butyric acid ethyl ester to a solution of 100 parts by volume.

Example 5

By treating 10 parts of 2,4-dioxo-3,3-diethyl tetrahydro pyridine with a mixture of 30 parts of $\beta$-acetamino butyric acid ethyl ester and 64 parts of water, a clear and stable solution is obtained, which may be further diluted with water.

Example 6

10 parts of diethyl barbituric acid are dissolved in 60 parts of $\beta$-acetamino butyric acid n-propyl ester, whereupon water is added to the solution until the quantity amounts to 100 parts by volume. The solution is colourless and stable.

I claim:

1. A homogeneous liquid mixture comprising a difficultly water soluble organic medicinal agent dissolved in a solvent selected from the group consisting of a lower saturated alkyl ester of $\beta$-acetamino butyric acid, the alkyl radical of which contains not more than three carbon atoms, and a lower saturated alkyl ester of $\beta$-acetamino butyric acid, the alkyl radical of which contains not more than three carbon atoms, and water.

2. A homogeneous liquid mixture comprising a difficultly water soluble organic medicinal agent dissolved in a solvent consisting of a lower saturated alkyl ester of $\beta$-acetamino butyric acid, the alkyl radical of which contains not more than three carbon atoms, and water.

3. A homogeneous liquid mixture comprising a difficultly water soluble organic medicinal agent dissolved in a solvent consisting of β-acetamino butyric acid ethyl ester and water.

4. A homogeneous liquid mixture comprising an organic hypnotic agent dissolved in a solvent consisting of a lower saturated alkyl ester of β-acetamino butyric acid, the alkyl radical of which contains not more than three carbon atoms, and water.

5. A homogeneous liquid mixture comprising a barbituric acid hypnotic agent dissolved in a solvent consisting of a lower saturated alkyl ester of β-acetamino butyric acid, the alkyl radical of which contains not more than three carbon atoms, and water.

6. A homogeneous liquid mixture comprising an allyl isopropyl barbituric acid dissolved in a solvent consisting of a lower saturated alkyl ester of β-acetamino butyric acid, the alkyl radical of which contains not more than three carbon atoms, and water.

7. A homogeneous liquid mixture comprising 2,4-dioxo-3,3-diethyl-tetrahydro pyridine dissolved in a solvent consisting of a lower saturated alkyl ester of β-acetamino butyric acid, the alkyl radical of which contains not more than three carbon atoms, and water.

8. A homogeneous liquid mixture comprising quinine hydrochloride dissolved in a solvent consisting of a lower saturated alkyl ester of β-acetamino butyric acid, the alkyl radical of which contains not more than three carbon atoms, and water.

OTTO SCHNIDER.